(12) United States Patent
Yamaoka et al.

(10) Patent No.: US 11,313,962 B2
(45) Date of Patent: Apr. 26, 2022

(54) PRESENCE/ABSENCE DETECTION METHOD, NON-TRANSITORY STORAGE MEDIUM, SENSOR PROCESSING SYSTEM, AND SENSOR SYSTEM

(71) Applicant: PANASONIC INTELLECTUAL PROPERTY CORPORATION OF AMERICA, Torrance, CA (US)

(72) Inventors: Masaru Yamaoka, Osaka (JP); Toshiaki Tanaka, Hyogo (JP); Kenji Masuda, Osaka (JP); Atsushi Takahashi, Nara (JP); Hidehiko Ichikawa, Gunma (JP)

(73) Assignee: PANASONIC INTELLECTUAL PROPERTV CORPORATION OF AMERICA, Torrance, CA (US)

( * ) Notice: Subject to any disclaimer, the term of this patent is extended or adjusted under 35 U.S.C. 154(b) by 438 days.

(21) Appl. No.: 16/289,176

(22) Filed: Feb. 28, 2019

(65) Prior Publication Data
US 2019/0277958 A1    Sep. 12, 2019

(30) Foreign Application Priority Data
Mar. 8, 2018   (JP) .............................. JP2018-042434

(51) Int. Cl.
  *G01S 13/56* (2006.01)
(52) U.S. Cl.
  CPC .................................... *G01S 13/56* (2013.01)
(58) Field of Classification Search
  CPC ....................................................... G01S 13/56
  (Continued)

(56) References Cited

U.S. PATENT DOCUMENTS

| 5,226,420 A * | 7/1993 | Peterson ............. G01S 15/8981 |
| | | 600/455 |
| 6,426,716 B1 * | 7/2002 | McEwan ................. G01S 13/04 |
| | | 329/311 |

(Continued)

FOREIGN PATENT DOCUMENTS

| JP | 2013-238442 | 11/2013 |
| JP | 2017-000484 | 1/2017 |

OTHER PUBLICATIONS

Official Communication issued in Japanese Patent Application No. 2018-042434, dated May 11, 2021 with an English translation thereof.

*Primary Examiner* — Erin F Heard
*Assistant Examiner* — Helena H Seraydaryan
(74) *Attorney, Agent, or Firm* — Greenblum & Bernstein, P.L.C.

(57) ABSTRACT

Disclosed herein is a sensor processing system including an acquisition unit, a time series analysis unit, and a decision unit. The acquisition unit acquires measurement data from a measuring unit. The measuring unit measures a physical quantity, of which a value varies depending on whether a human is present in, or absent from, an object space. The time series analysis unit obtains an analysis model for a time series analysis in which the measurement data acquired at a predetermined timing is represented by multiple items, acquired before the predetermined timing, of the measurement data. The decision unit decides, depending on a decision condition including a condition concerning a coefficient of the analysis model, whether the human is present or absent at the predetermined timing.

6 Claims, 5 Drawing Sheets

(58) Field of Classification Search
USPC .......................................................... 342/28
See application file for complete search history.

(56) References Cited

U.S. PATENT DOCUMENTS

| 2010/0204550 A1* | 8/2010 | Heneghan | A61B 5/411 |
| | | | 600/301 |
| 2014/0203972 A1* | 7/2014 | Vock | A61B 5/14542 |
| | | | 342/463 |

* cited by examiner

First-Order Coefficient

PRESENCE/ABSENCE DETECTION METHOD, NON-TRANSITORY STORAGE MEDIUM, SENSOR PROCESSING SYSTEM, AND SENSOR SYSTEM

CROSS-REFERENCE TO RELATED APPLICATION

This application claims the benefit of foreign priority to Japanese Patent Application No. 2018-42434 filed on Mar. 8, 2018, the entire contents of which are hereby incorporated by reference.

TECHNICAL FIELD

The present disclosure generally relates to a presence/absence detection method, a non-transitory storage medium, a sensor processing system, and a sensor system, and more particularly relates to a presence/absence detection method, a non-transitory storage medium, a sensor processing system, and a sensor system, all of which are configured or designed to decide whether a human is present in, or absent from, an object space.

BACKGROUND ART

Various techniques for measuring the cardiac rate, respiration, and body movement of an organism by a noncontact method have been proposed in the art.

For example, Japanese Unexamined Patent Application Publication No. 2017-484 (hereinafter referred to as "D1") discloses a noncontact activity sensor (sensor processing system), which includes a Doppler sensor (measuring unit), a distance sensor, and a processor. The processor calculates the volume of activity of a subject, falling within the sensing range of the sensor (air-conditioned space), based on the amplitude and/or frequency of a detection signal of the Doppler sensor and a detection signal of the distance sensor. The processor also decides, based on the detection signal of the Doppler sensor and the detection signal of the distance sensor, whether or not the user (a human) is now staying in, or absent from, the air-conditioned space.

However, when deciding, based on the amplitude and/or frequency of the detection signal of the Doppler sensor, whether the user is present in, or absent from, the space, the noncontact activity sensor of D1 may make an erroneous decision that the human be absent from the object space while he or she is at rest.

SUMMARY

The present disclosure provides a presence/absence detection method, a non-transitory storage medium, a sensor processing system, and a sensor system, all of which are configured or designed to improve the accuracy of decision about presence/absence detection.

A presence/absence detection method according to an aspect of the present disclosure includes acquisition processing, time series analysis processing, and decision processing. The acquisition processing includes acquiring measurement data from a measuring unit. The measuring unit is configured to measure a physical quantity, of which a value varies depending on whether a human is present in, or absent from, an object space. The time series analysis processing includes obtaining an analysis model for a time series analysis in which the measurement data acquired at a predetermined timing is represented by multiple items, acquired before the predetermined timing, of the measurement data. The decision processing includes deciding, depending on a decision condition including a condition concerning a coefficient of the analysis model, whether the human is present or absent at the predetermined timing.

A non-transitory storage medium according to another aspect of the present disclosure has stored thereon a program. The program is designed to make a computer system execute acquisition processing, time series analysis processing, and decision processing. The acquisition processing includes acquiring measurement data from a measuring unit. The measuring unit is configured to measure a physical quantity, of which a value varies depending on whether a human is present in, or absent from, an object space. The time series analysis processing includes obtaining an analysis model for a time series analysis in which the measurement data acquired at a predetermined timing is represented by multiple items, acquired before the predetermined timing, of the measurement data. The decision processing includes deciding, depending on a decision condition including a condition concerning a coefficient of the analysis model, whether the human is present or absent at the predetermined timing.

A sensor processing system according to still another aspect of the present disclosure includes an acquisition unit, a time series analysis unit, and a decision unit. The acquisition unit is configured to acquire measurement data from a measuring unit. The measuring unit is configured to measure a physical quantity, of which a value varies depending on whether a human is present in, or absent from, an object space. The time series analysis unit is configured to obtain an analysis model for a time series analysis in which the measurement data acquired at a predetermined timing is represented by multiple items, acquired before the predetermined timing, of the measurement data. The decision unit is configured to decide, depending on a decision condition including a condition concerning a coefficient of the analysis model, whether the human is present or absent at the predetermined timing.

A sensor system according to yet another aspect of the present disclosure includes the sensor processing system described above, and the measuring unit. The measuring unit is configured to measure the physical quantity, of which the value varies depending on whether the human is present in, or absent from, the object space. The acquisition unit acquires the measurement data from the measuring unit.

DESCRIPTION OF EMBODIMENTS

First Embodiment (1) Overview

Figure 1:
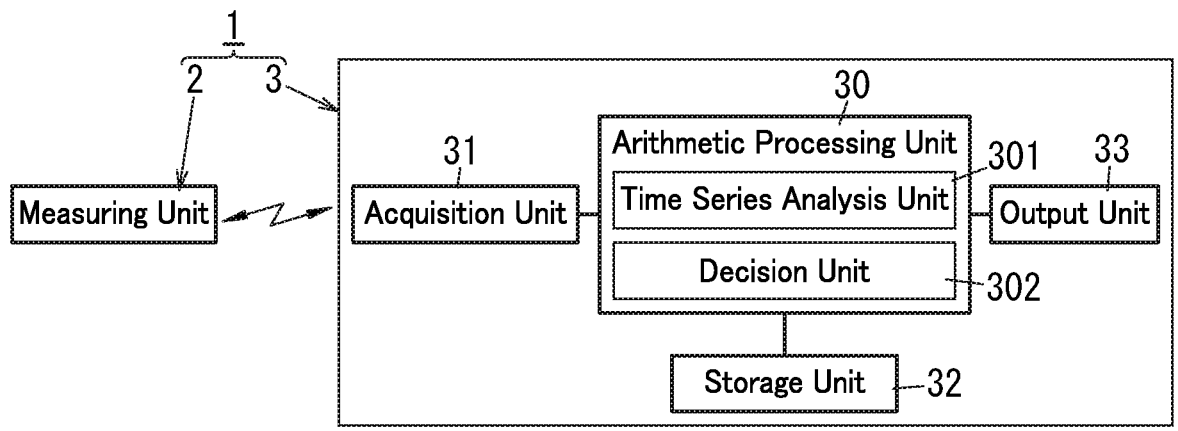
FIG. 1 is a block diagram of a sensor system according to a first embodiment of the present disclosure.

An overview of a sensor processing system 3 and sensor system 1 according to a first exemplary embodiment will be described with reference to FIGS. 1 and 2.

The sensor system 1 of this embodiment is a system for deciding whether a human is present in, or absent from, an object space. As used herein, the "object space" refers to a space in a private room provided for a facility such as a nursing care facility, a dwelling house with on-demand nursing care services for senior citizens, or a hospital and used by a "human" as the subject. If the object space is a space in a private room of a nursing care facility or a dwelling house with on-demand nursing care services for senior citizens, then the "human" as the subject is the resident of the private room (i.e., a person to be taken care of). On the other hand, if the object space is a space in a room of a hospital, then the "human" as the subject is a patient hospitalized in the room of the hospital to receive treatment, for example. When the sensor system 1 is used to decide whether a human is present in, or absent from, a space in a private room (i.e., the object space) of a nursing care facility, a dwelling house with on-demand nursing care services for senior citizens, or a hospital, there is a growing demand for detecting, with reliability, any departure of the human as the subject (who may either a person to be taken care of or a patient) out of the object space. The sensor processing system 3 and sensor system 1 according to this embodiment are designed to improve the accuracy of decision about whether the human is present in, or absent from, the object space.

The sensor system 1 includes a measuring unit 2 and the sensor processing system 3.

Figure 2:
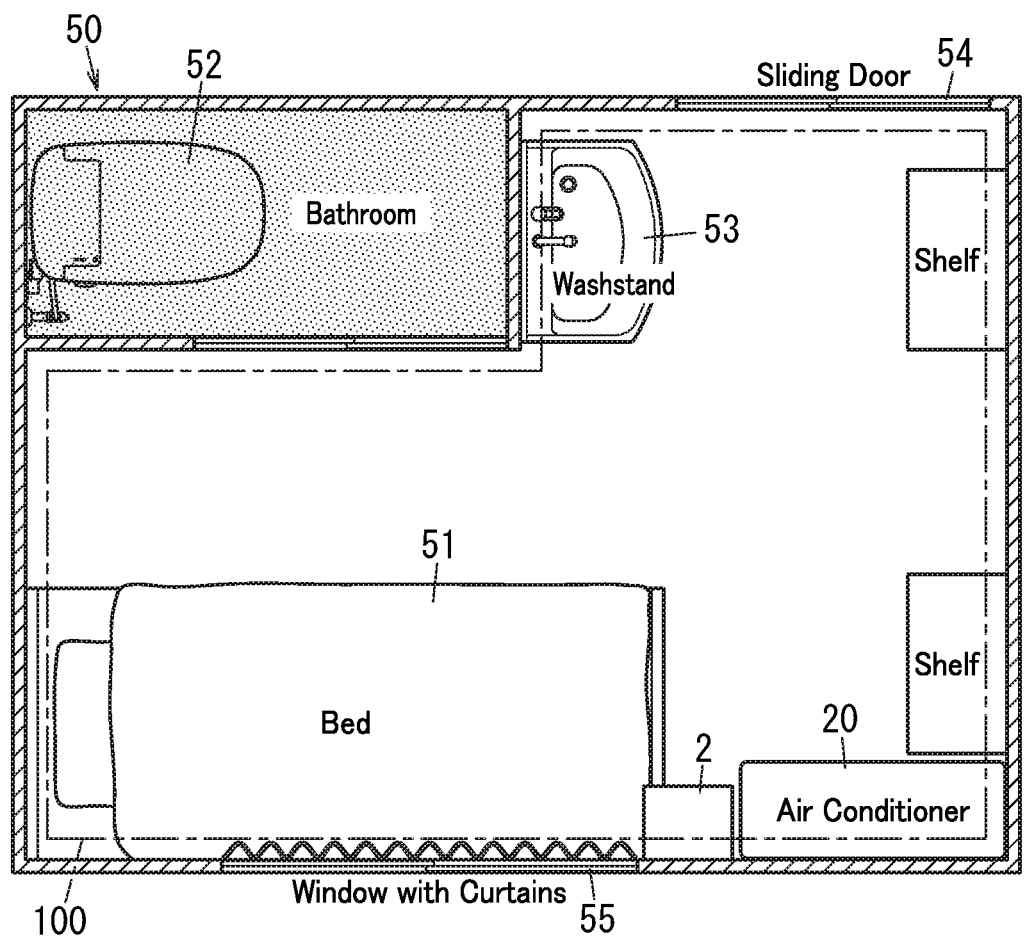
FIG. 2 depicts an exemplary facility to which the sensor system of the present disclosure is applicable.

The measuring unit 2 measures a physical quantity, of which the value varies depending on whether the human is present in, or absent from, the object space 100 (see FIG. 2). In this embodiment, the measuring unit 2 measures, by a noncontact method, a physical quantity, of which the value varies depending on whether the human is present in, or absent from, the object space 100.

The sensor processing system 3 includes an acquisition unit 31, a time series analysis unit 301, and a decision unit 302.

The acquisition unit 31 acquires measurement data from the measuring unit 2.

The time series analysis unit 301 obtains an analysis model for a time series analysis in which the measurement data acquired at a predetermined timing is represented by multiple items, acquired before the predetermined timing, of the measurement data.

The decision unit 302 decides, depending on a decision condition including a condition concerning a coefficient of the analysis model, whether the human is present or absent at the predetermined timing.

As can be seen, in this sensor processing system 3, the decision unit 302 decides, depending on a decision condition including a condition concerning a coefficient of the analysis model obtained by the time series analysis unit 301, whether the human is present or absent at the predetermined timing. This reduces the chances of the decision unit 302 being affected by a temporary variation in measurement data, thus improving the accuracy of the decision made by the decision unit 302.

(2) Details

The sensor processing system 3 and sensor system 1 according to the first embodiment will be described in detail with reference to the accompanying drawings.

(2.1) Configuration

The sensor system 1 includes the measuring unit 2 and the sensor processing system 3 as described above.

The sensor system 1 decides whether a human is present in, or absent from, a private room 50 including an object space 100 as shown in FIG. 2, for example. The private room 50 is a room used by a human as the subject (i.e., a room in which he or she lives or is hospitalized) in a facility such as a nursing care facility, a dwelling house with on-demand nursing care services for senior citizens, or a hospital. The private room 50 is provided with equipment including a bed 51, a bathroom with a toilet 52, a washstand 53, a sliding door 54 at the entrance, and a window 55. Note that these pieces of equipment including the bed 51, the toilet 52, the washstand 53, the sliding door 54, and the window 55 do not have to be provided for, but may be omitted as appropriate from, the private room 50. On a wall of the private room 50, installed is an air conditioner 20 for conditioning the air in the private room 50. In this embodiment, the measuring unit 2 is arranged as a sensor beside the air conditioner 20, for example, in order to detect the presence of the human in the private room 50. In other words, the object space 100 is a space, where the measuring unit 2 is able to detect the human, of the private room 50.

The measuring unit 2 may include a radio wave Doppler sensor and a signal processing unit, for example. The Doppler sensor may transmit radio waves, falling within the microwave band, for example, to the object space 100 (e.g., a space including an area where the bed 51 is installed) at regular time intervals (of one second, for example). The Doppler sensor receives a reflected wave reflected from the human present in the object space 100 and other objects. The signal processing unit of the measuring unit 2 performs signal processing on the reflected wave received by the Doppler sensor, thus generating measurement data representing the body movement (hereinafter referred to as "body movement measurement data") of the human present in the object space 100. In addition, the signal processing unit of the measuring unit 2 generates measurement data representing the body movement caused by heartbeat (hereinafter referred to as "cardiac rate measurement data") by having the body movement measurement data filtered and extracting a frequency component of the body movement caused by the heartbeat. Besides, the signal processing unit of the measuring unit 2 also generates measurement data representing the body movement caused by respiration (hereinafter referred to as "respiratory measurement data") by having the body movement measurement data filtered and extracting a frequency component of the body movement caused by the respiration. In this case, the interval at which the signal processing unit of the measuring unit 2 generates the cardiac rate measurement data and the respiratory measurement data is longer than the interval at which the signal processing unit generates the body movement measurement data. For example, the signal processing unit of the measuring unit 2 may generate the body movement measurement data every second, and generate the cardiac rate measurement data and the respiratory measurement data every five seconds.

The measuring unit 2 outputs the body movement measurement data representing the body movement of the human present in the object space 100, the cardiac rate measurement data representing the body movement caused by his or her heartbeat, and the respiratory measurement data representing the body movement caused by his or her respiration, to the sensor processing system 3. The measuring unit 2 includes a wireless communications unit compliant with Bluetooth®, for example, and transmits these three types of measurement data to the sensor processing system 3 wirelessly.

The measuring unit 2 of this embodiment has made, based on the body movement measurement data and other data, a decision about whether the human is present in, or absent from, the object space 100, and wirelessly transmits the decision about the presence/absence detection to the sensor processing system 3. Note that the measuring unit 2 does not have to perform the decision processing of deciding whether the human is present in, or absent from, the object space 100, but may wirelessly transmit only the measurement data to the sensor processing system 3.

In this example, the object space 100 in which the measuring unit 2 detects the body movement of the human is a space including the area where the bed 51 is installed. However, this is only an example and should not be construed as limiting. Alternatively, the object space 100 may also be the entire private room 50 or changed into any other space as appropriate. Besides, the measuring unit 2 does not have to be a radio wave Doppler sensor but may also be an ultrasonic Doppler sensor that transmits an ultrasonic wave as well. Furthermore, the method of establishing communication between the measuring unit 2 and the sensor processing system 3 does not have to be a wireless communication but may also be a wired communication. In addition, the measuring unit 2 obtains the measurement data such as the body movement measurement data by a noncontact method, and therefore, does not interfere with the human's movement.

The sensor processing system 3 includes an arithmetic processing unit 30, an acquisition unit 31, a storage unit 32, and an output unit 33. The arithmetic processing unit 30 performs the functions of the time series analysis unit 301 and the decision unit 302. In this embodiment, the sensor processing system 3 may be implemented, for example, as a personal computer installed in a station of caregivers, nurses, or any other type of employees in a facility such as a nursing care facility, a dwelling house with on-demand nursing care services for senior citizens, or a hospital.

The acquisition unit 31 includes a wireless communications unit compliant with Bluetooth®, for example. The acquisition unit 31 wirelessly communicates with the measuring unit 2 either periodically or non-periodically to acquire the body movement measurement data, the cardiac rate measurement data, and the respiratory measurement data from the measuring unit 2. On acquiring the body movement measurement data, the cardiac rate measurement data, and the respiratory measurement data from the measuring unit 2, the acquisition unit 31 outputs the measurement data acquired to the arithmetic processing unit 30.

The storage unit 32 may include, for example, an electrically programmable nonvolatile memory such as an electrically erasable programmable read-only memory (EEPROM) or a volatile memory such as a random access memory (RAM). The storage unit 32 stores a program to be executed by the arithmetic processing unit 30. The storage unit 32 also temporarily stores data such as the results of the arithmetic processing performed by the arithmetic processing unit 30. In addition, the storage unit 32 further stores the measurement data that the acquisition unit 31 acquired in the past from the measuring unit 2 during a specified period (of a few days, for example) in order to calculate decision values TH1, TH2 (to be described later).

The arithmetic processing unit 30 may be implemented, for example, as a microcomputer including a processor and a memory. That is to say, the arithmetic processing unit 30 is implemented as a computer system including a processor and a memory. In other words, the computer system performs the functions of the arithmetic processing unit 30 by making the processor execute a predetermined program stored in the memory. The program may be stored in advance in either the memory or the storage unit 32 or may also be downloaded via a telecommunications line such as the Internet or distributed after having been stored on a non-transitory storage medium such as a memory card.

The time series analysis unit 301 performs time series analysis processing including obtaining an analysis model for a times series analysis in which the measurement data acquired at a predetermined timing is represented by multiple items, acquired before the predetermined timing, of the measurement data. The acquisition unit 31 acquires the measurement data from the measuring unit 2 every second, for example. For instance, the time series analysis unit 301 may obtain an analysis model for a time series analysis in which the body movement measurement data acquired at a predetermined timing is represented by multiple items (e.g., 30 items), acquired before the predetermined timing, of measurement data. In this embodiment, the time series analysis unit 301 obtains, by using an auto-regressive (AR) model, for example, an analysis model for an autocorrelation function in which the body movement measurement data acquired at a predetermined timing is represented by 30 items of measurement data collected over the past 30 seconds. Note that the analysis model for the time series analysis performed by the time series analysis unit 301 does not have to be the auto-regressive model but may also be any other analysis model such as an extended Kalman model. The analysis model may be changed as appropriate with the computational complexity and other factors taken into account.

The decision unit 302 decides, depending on a decision condition including a condition concerning a coefficient of the analysis model obtained by the time series analysis unit 301, whether the human is present or absent at the predetermined timing. For example, the decision unit 302 may decide, depending on a decision condition that the coefficient of the analysis model obtained by the time series analysis unit 301 be greater than a preset threshold value or that the magnitude of the measurement data acquired by the measuring unit 2 be greater than a preset decision value, whether the human is present or absent at the predetermined timing. That is to say, the decision unit 302 determines, when finding a first-order coefficient of the auto-regressive model greater than a preset threshold value or finding the magnitude of the measurement data greater than a decision value, that the human be present in the object space 100 (i.e., he or she be currently in the room). The decision unit 302 determines, when finding the first-order coefficient of the auto-regressive model equal to or less than the preset threshold value or finding the magnitude of the measurement data equal to or less than the decision value, that the human be absent from the object space 100 (i.e., he or she be currently out of the room).

The output unit 33 may be a display device, a loudspeaker, or a printer, for example. The output unit 33 outputs the decision made by the decision unit 302. The caregiver, nurse, or any other person in the station is allowed to confirm, by checking the decision provided by the output unit 33, whether the human is present in, or absent from, the private room 50. Thus, if the subject to be detected has gone out of the private room 50, then the caregiver, nurse, or any other person in the station may take an appropriate action such as looking around for the subject person.

Figure 3:
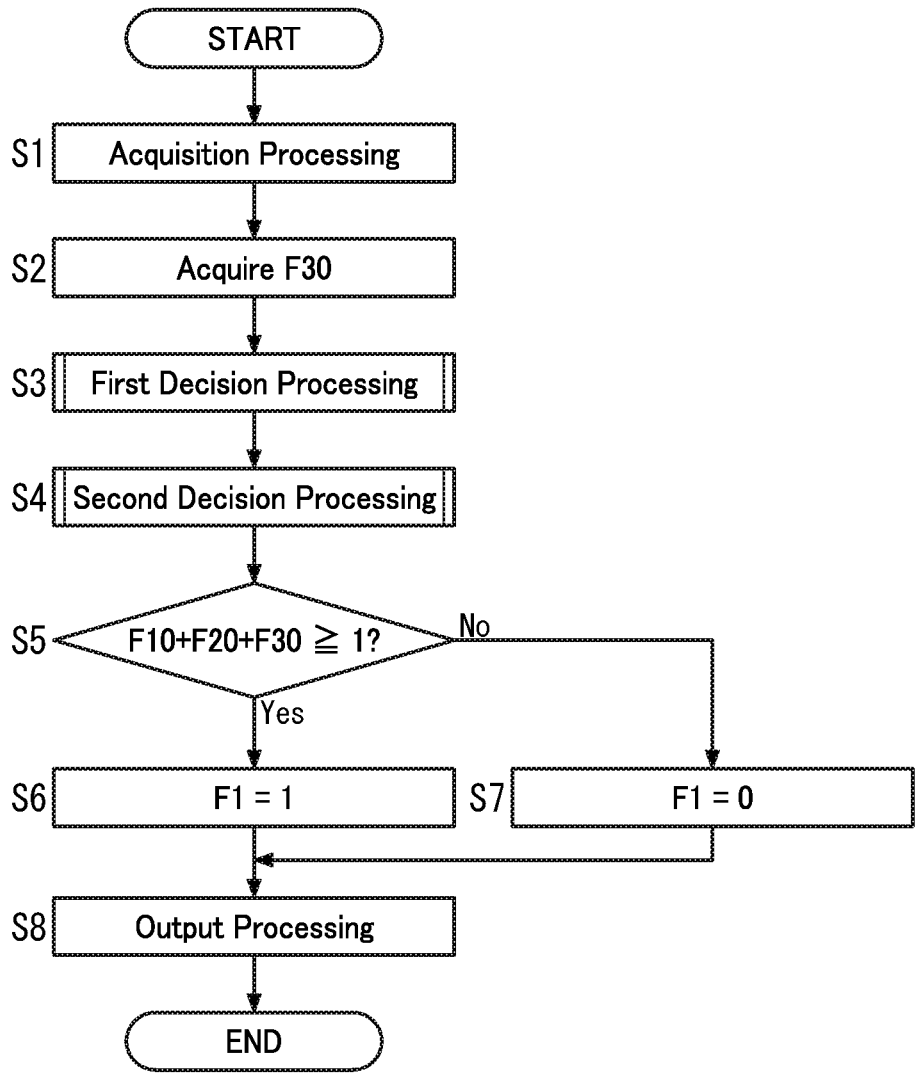
FIG. 3 is a flowchart showing the procedure of operation of the sensor system.

(2.2) Description of Decision Operation (2.2.1) Description of Overall Decision Operation Next, the overall decision operation of a sensor processing system 3 and sensor system 1 according to this embodiment will be described with reference to the flowchart of FIG. 3.

The arithmetic processing unit 30 starts, at regular intervals (e.g., at an interval of one second), performing the processing of deciding whether the human is present in, or absent from, the object space 100.

The arithmetic processing unit 30 makes the acquisition unit 31 perform acquisition processing including acquiring measurement data and biometric data from the measuring unit 2 at regular intervals (e.g., at an interval of one second) (in Step S1). In this embodiment, the acquisition unit 31 acquires the body movement measurement data, cardiac rate measurement data, and respiratory measurement data every second, for example. Then, the acquisition unit 31 outputs the body movement measurement data, cardiac rate measurement data, and respiratory measurement data acquired from the measuring unit 2 to the arithmetic processing unit 30. The measuring unit 2 updates the body movement measurement data every second and also updates the cardiac rate measurement data and the respiratory measurement data every five seconds, for example. Thus, the cardiac rate measurement data and respiratory measurement data that the acquisition unit 31 has acquired from the measuring unit 2 are updated every five seconds, for example.

The arithmetic processing unit 30 performs, on receiving the measurement data (namely, the body movement measurement data, cardiac rate measurement data, and respiratory measurement data) from the acquisition unit 31, data processing such as noise reduction and calculating the moving average on these types of data. The arithmetic processing unit 30 stores the processed body movement measurement data in the storage unit 32.

In addition, the arithmetic processing unit 30 also acquires, from the measuring unit 2, a tentative decision flag F30 indicating the decision, made by the measuring unit 2, about the presence or absence of a human in/from the object space 100, at regular intervals (of, e.g., one second) (in Step S2). Note that this processing step S2 performed by the measuring unit 2 to decide whether the human is present in, or absent from, the object space 100 is not an indispensable processing step but may be omitted as appropriate.

Next, the arithmetic processing unit 30 performs first decision processing including deciding, based on the values (magnitudes) of the cardiac rate measurement data and respiratory measurement data, out of the measurement data provided by the acquisition unit 31, whether the human is present in, or absent from, the object space 100 (in Step S3). If the result of the first decision processing is that the human be present in the object space 100, then the arithmetic processing unit 30 sets the value of a tentative decision flag F10 at one. On the other hand, if the result of the first decision processing is that the human be absent from the object space 100, then the arithmetic processing unit 30 sets the value of the tentative decision flag F10 at zero. The first decision processing will be described in further detail later.

Subsequently, the arithmetic processing unit 30 performs second decision processing including deciding, by time series analysis, whether the human is present in, or absent from, the object space 100 (in Step S4). If the result of the second decision processing is that the human be present in the object space 100, then the arithmetic processing unit 30 sets the value of a tentative decision flag F20 at one. On the other hand, if the result of the second decision processing is that the human be absent from the object space 100, then the arithmetic processing unit 30 sets the value of the tentative decision flag F20 at zero. The second decision processing will be described in further detail later.

After having performed the first decision processing and second decision processing, the arithmetic processing unit 30 calculates the sum of the tentative decision flags F10, F20, and F30 to decide whether the sum of these tentative decision flags F10, F20, and F30 is equal to or greater than one (in Step S5).

When finding the sum (F10+F20+F30) of the tentative decision flags F10, F20, and F30 equal to or greater than one (i.e., if the answer is YES in Step S5), the arithmetic processing unit 30 sets the value of a presence flag F1 at one (in Step S6). That is to say, when finding at least one of the result of the decision processing by the measuring unit 2, the result of the first decision processing, or the result of the second decision processing indicating that the human be present there, the arithmetic processing unit 30 determines that the human be present in the object space 100.

On the other hand, when finding the sum (F10+F20+F30) of the tentative decision flags F10, F20, and F30 less than one (i.e., if the answer is NO in Step S5), the arithmetic processing unit 30 sets the value of a presence flag F1 at zero (in Step S7). That is to say, when finding all of the result of the decision processing by the measuring unit 2, the result of the first decision processing, and the result of the second decision processing indicating that the human be absent there, the arithmetic processing unit 30 determines that the human be absent from the object space 100.

Then, the arithmetic processing unit 30 makes, according to the value of the presence flag F1, the output unit 33 output the decision about whether the human is present in, or absent from, the object space 100 (in Step S8). In this processing step, the output unit 33 may output the decision by presenting it on a display device of a personal computer serving as the sensor processing system 3, emitting a voice message, printing it out, writing it on a non-transitory storage medium, or transmitting it to a telecommunications device, for example.

The arithmetic processing unit 30 performs this series of processing steps S1-S8 repeatedly at regular intervals (of, e.g., one second) to make a decision about whether the human is present in, or absent from, the object space 100 and output the decision.

(2.2.2) Description of First Decision Processing

Figure 4:
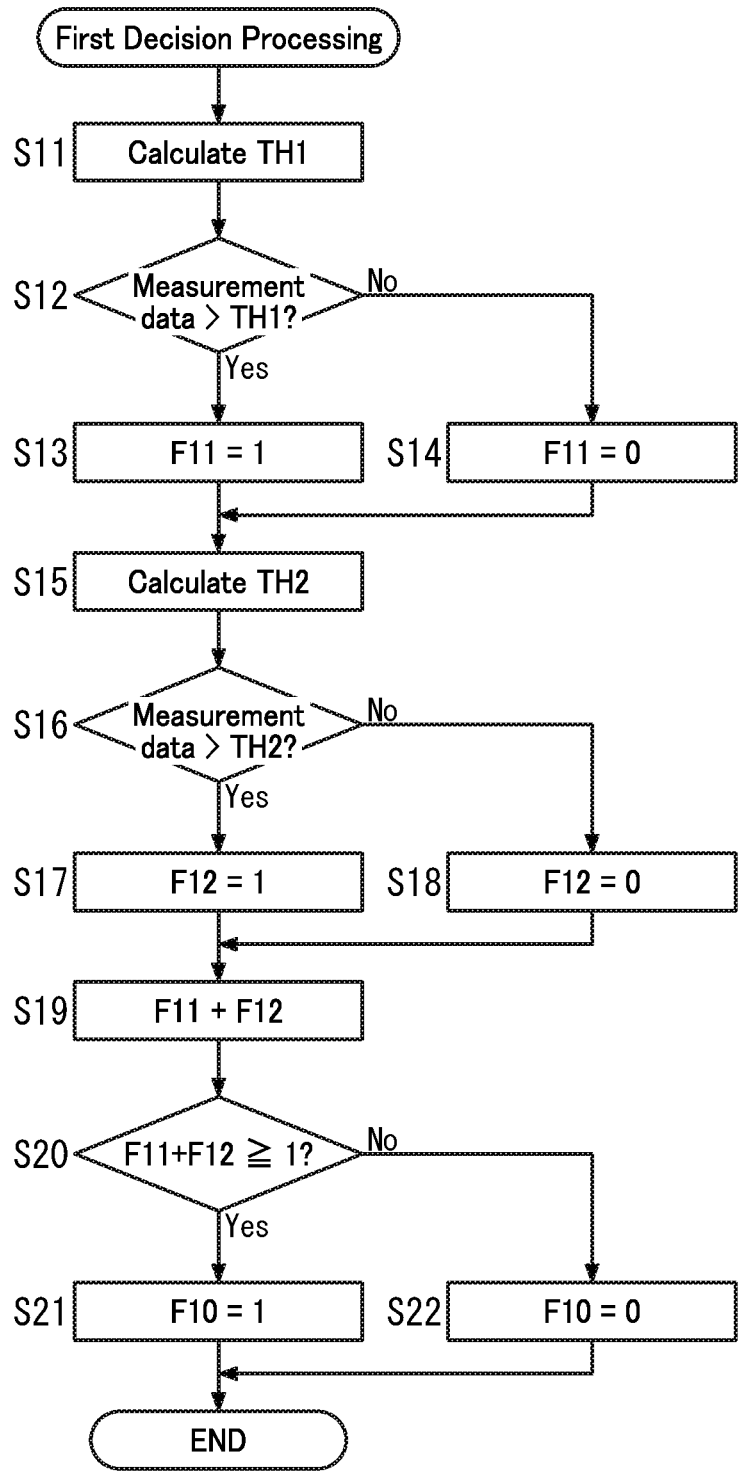
FIG. 4 is a flowchart showing the procedure of first decision processing to be performed by the sensor system.

Next, it will be described with reference to FIG. 4 how the arithmetic processing unit 30 performs the first decision processing.

By performing this first decision processing, the arithmetic processing unit 30 makes, based on the respective magnitudes of the cardiac rate measurement data and respiratory measurement data acquired in the acquisition processing step (S1), a decision about whether the human is present in, or absent from, the object space 100.

Specifically, first, the arithmetic processing unit 30 calculates, based on the cardiac rate measurement data collected in the past during a specified period (of, e.g., a few days) and stored in the storage unit 32, a decision value TH1 for deciding whether the human is present or absent there (in Step S11). The arithmetic processing unit 30 sets the decision value TH1 by performing, for the past specified period, machine learning based on the cardiac rate measurement data for a period in which the decision indicates the human be present in the object space 100 and the cardiac rate measurement data for a period in which the decision indicates the human be absent from the object space 100.

Next, the arithmetic processing unit 30 compares the magnitude of the cardiac rate measurement data with the decision value TH1 (in Step S12). When finding the magnitude of the cardiac rate measurement data greater than the decision value TH1 (if the answer is YES in Step S12), the arithmetic processing unit 30 sets the value of a cardiac rate decision flag F11 at one (in Step S13). On the other hand, when finding the magnitude of the cardiac rate measurement data equal to or less than the decision value TH1 (if the answer is NO in Step S12), the arithmetic processing unit 30 sets the value of the cardiac rate decision flag F11 at zero (in Step S14).

In addition, the arithmetic processing unit 30 also calculates, based on the respiratory measurement data collected in the past during a specified period (of, e.g., a few days) and stored in the storage unit 32, another decision value TH2 for deciding whether the human is present or absent there (in Step S15). The arithmetic processing unit 30 sets the decision value TH2 by performing, for the past specified period, machine learning based on the respiratory measurement data for a period in which the decision indicates the human be present in the object space 100 and the respiratory measurement data for a period in which the decision indicates the human be absent from the object space 100.

Next, the arithmetic processing unit 30 compares the magnitude of the respiratory measurement data with the decision value TH2 (in Step S16). When finding the magnitude of the respiratory measurement data greater than the decision value TH2 (if the answer is YES in Step S16), the arithmetic processing unit 30 sets the value of a respiratory decision flag F12 at one (in Step S17). On the other hand, when finding the magnitude of the respiratory measurement data equal to or less than the decision value TH2 (if the answer is NO in Step S16), the arithmetic processing unit 30 sets the value of the respiratory decision flag F12 at zero (in Step S18).

Subsequently, the arithmetic processing unit 30 calculates the sum (F11+F12) of the value of the cardiac rate decision flag F11 and the value of the respiratory decision flag F12 (in Step S19).

Next, the arithmetic processing unit 30 decides whether or not the sum (F11+F12) is equal to or greater than one (in Step S20). When finding the sum (F11+F12) equal to or greater than one, the arithmetic processing unit 30 sets the value of the tentative decision flag F10 at one (in Step S21) to end the first decision processing. On the other hand, when finding the sum (F11+F12) less than one, the arithmetic processing unit 30 sets the value of the tentative decision flag F10 at zero (in Step S22) to end the first decision processing.

That is to say, when finding at least one of the condition that the magnitude of the cardiac rate measurement data be greater than the decision value TH1 or the condition that the magnitude of the respiratory measurement data be greater than the decision value TH2 satisfied, the arithmetic processing unit 30 sets the value of the tentative decision flag F10 at one. On the other hand, when finding the magnitude of the cardiac rate measurement data equal to or less than the decision value TH1 and the magnitude of the respiratory measurement data equal to or less than the decision value TH2, the arithmetic processing unit 30 sets the value of the tentative decision flag F10 at zero.

According to this embodiment, the arithmetic processing unit 30 serving as the setting unit performs the setting processing including setting the decision values TH1 and TH2 based on the magnitudes of the measurement data (including the cardiac rate measurement data and the respiratory measurement data) in the specified period. This allows for changing the decision values depending on a condition such as the detection condition of a human as the subject and the sensitivity of the measuring unit 2, thus improving the accuracy of decision made about the presence or absence of the human. Note that the arithmetic processing unit 30 does not have to perform the processing of setting the decision values every time the arithmetic processing unit 30 performs the first decision processing. Alternatively, the arithmetic processing unit 30 may also set decision values based on the magnitudes of the measurement data during a past particular period (specified period) and perform the first decision processing based on these decision values. Optionally, the arithmetic processing unit 30 may also set the decision values based on the magnitudes of the measurement data during the previous particular period (specified period) at a predetermined update timing.

(2.2.3) Description of Second Decision Processing

Figure 5:
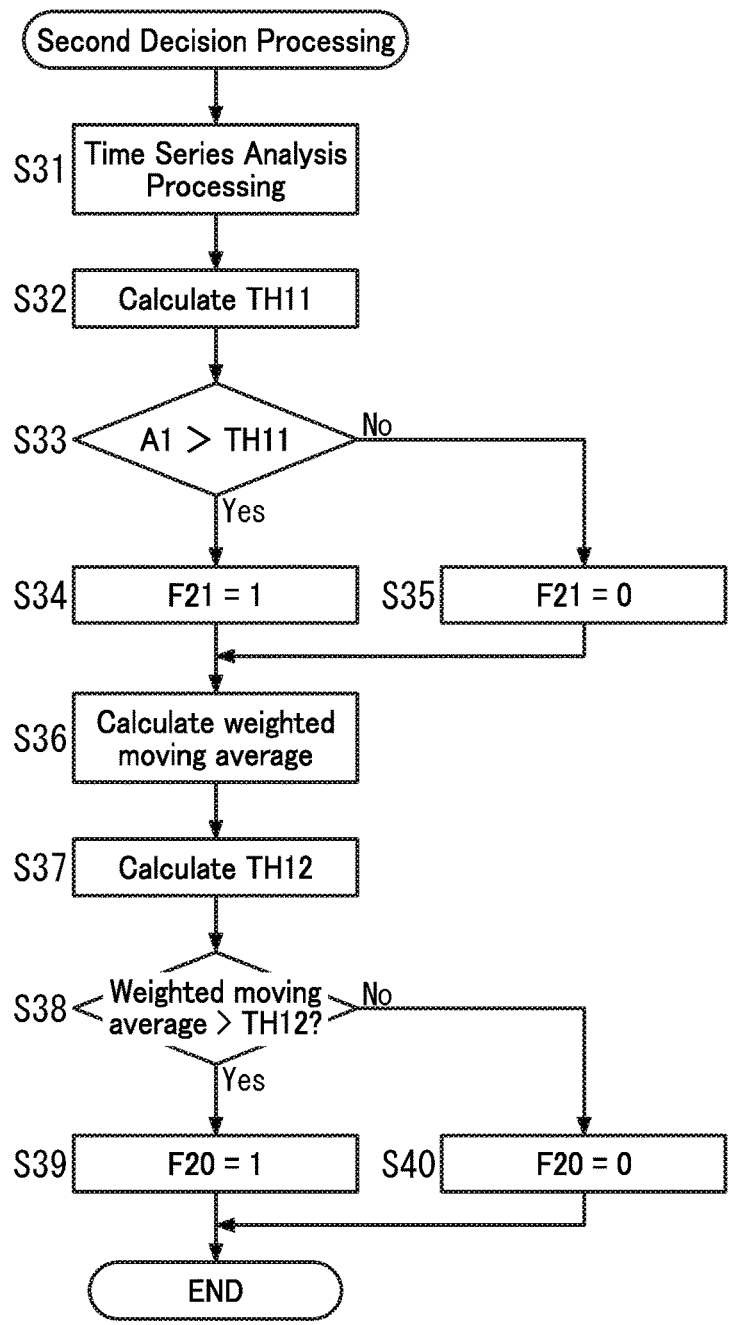
FIG. 5 is a flowchart showing the procedure of second decision processing to be performed by the sensor system.

Next, it will be described with reference to FIG. 5 how the arithmetic processing unit 30 performs the second decision processing.

In the second decision processing, the arithmetic processing unit 30 makes a decision about the presence or absence of a human in/from the object space 100 by performing the time series analysis processing including obtaining, based on the body movement measurement data acquired through the acquisition processing (S1), an analysis model for a time series analysis. Alternatively, in performing this second decision processing, the arithmetic processing unit 30 may also perform the time series analysis processing based on either the cardiac rate measurement data or the respiratory measurement data, instead of the body movement measurement data.

The time series analysis unit 301 of the arithmetic processing unit 30 performs time series analysis processing including obtaining an analysis model for a time series analysis in which the body movement measurement data acquired this time by the acquisition unit 31 is represented by multiple items (e.g., 30 items), acquired in the past, of the measurement data (in Step S31). The time series analysis unit 301 of this embodiment obtains an analysis model based on an auto-regressive model, for example. In this example, the time series analysis unit 301 may obtain the following auto-regressive model relational expression:

$$X(0) = A1 \cdot X(1) + A2 \cdot X(2) + \ldots + A30 \cdot X(30)$$

where X(0) indicates the body movement measurement data acquired this time, X(n) indicates the body movement measurement data acquired n times ago, and An indicates an $n^{th}$-order coefficient. The arithmetic processing unit 30 calculates, based on the decision made through the first decision processing about the presence or absence, a threshold value TH11 for making a decision about the presence or absence based on a first-order coefficient A1 of the auto-regressive model (in Step S32).

Figure 6:
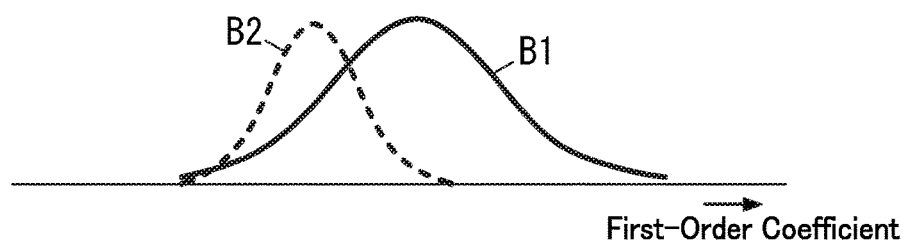
FIG. 6 is a graph showing the distribution of first-order coefficients of an auto-regressive model obtained by the sensor system.

Referring to FIG. 6, the curve B1 indicates the distribution of first-order coefficients A1 in a situation where the result of the first decision processing is that the human be present there (hereinafter referred to as a "presence state"), while the curve B2 indicates the distribution of first-order coefficients A1 in a situation where the result of the first decision processing is that the human be absent there (hereinafter referred to as an "absence state"). The present inventors discovered, based on the results shown in FIG. 6, that the first-order coefficient A1 of the auto-regressive model makes a significant difference depending on whether the human is present in, or absent from, the object space 100. Thus, the arithmetic processing unit 30 sets a threshold value TH11 for the first-order coefficient A1 of the auto-regressive model to distinguish a situation where the human is present in the object space 100 from a situation where the human is absent from the object space 100.

Thus, the arithmetic processing unit 30 calculates the average and standard deviation of the first-order coefficients A1 in a situation where the result of the first decision processing indicates the presence state for a past specified period. In addition, the arithmetic processing unit 30 also calculates the average and standard deviation of the first-order coefficients A1 in a situation where the result of the first decision processing indicates the absence state for the past specified period. The arithmetic processing unit 30 sets the threshold value TH11 based on the average and standard deviation of the first-order coefficients A1 in a situation where the result of the first decision processing indicates the presence and the average and standard deviation of the first-order coefficients A1 in a situation where the result of the first decision processing indicates the absence.

Then, the decision unit 302 of the arithmetic processing unit 30 compares the first-order coefficient A1, calculated in Step S31, of the auto-regressive model with the threshold value TH11 (in Step S33). When finding the first-order coefficient A1 of the auto-regressive model greater than the threshold value TH11 (if the answer is YES in Step S33), the decision unit 302 determines that the human be present in the object space 100, sets the value of a tentative decision flag F21 at one (in Step S34), and has the value of the tentative decision flag F21 stored in the storage unit 32. On the other hand, when finding the first-order coefficient A1 of the auto-regressive model equal to or less than the threshold value TH11 (if the answer is NO in Step S33), the decision unit 302 determines that the human be absent from the object space 100, sets the value of the tentative decision flag F21 at zero (in Step S35), and has the value of the tentative decision flag F21 stored in the storage unit 32.

After having calculated the tentative decision flag F21, the arithmetic processing unit 30 calculates a weighted moving average of a predetermined number of tentative decision flags F21 that were calculated in the past up to the present (in Step S36). For example, the arithmetic processing unit 30 calculates a weighted moving average of five tentative decision flags F21 up to the present.

In addition, the arithmetic processing unit 30 extracts, from the storage unit 32, the tentative decision flags F21 that were obtained in the past during the specified period when the result of the first decision processing indicated absence state, and calculates a threshold value TH12 based on the values of these tentative decision flags F21 (in Step S37). For example, the arithmetic processing unit 30 may calculate the average of the tentative decision flags F21 that were obtained when the result of the first decision processing indicated absence state and sets this average as the threshold value TH12.

The decision unit 302 compares the value of the weighted moving average obtained in Step S36 with the threshold value TH12 (in Step S38). When finding the value of the weighted moving average greater than the threshold value TH12 (if the answer is YES in Step S38), the decision unit 302 determines that the human be present in the object space 100, and sets the value of the tentative decision flag F20 at one (in Step S39) to end the second decision processing. On the other hand, when finding the value of the weighted moving average equal to or less than the threshold value TH12 (if the answer is NO in Step S38), the decision unit 302 determines that the human be absent from the object space 100 and sets the value of the tentative decision flag F20 at zero (in Step S40) to end the second decision processing.

As can be seen, in this second decision processing, the decision unit 302 decides, depending on a decision condition including a condition concerning a coefficient of the analysis model obtained by the time series analysis unit 301 (e.g., a condition that the coefficient be greater than a preset threshold value), whether the human is present or absent at the predetermined timing. This reduces the chances of the decision unit 302 being affected by a temporary variation in measurement data, thus improving the accuracy of the decision made by the decision unit 302.

Figure 7:
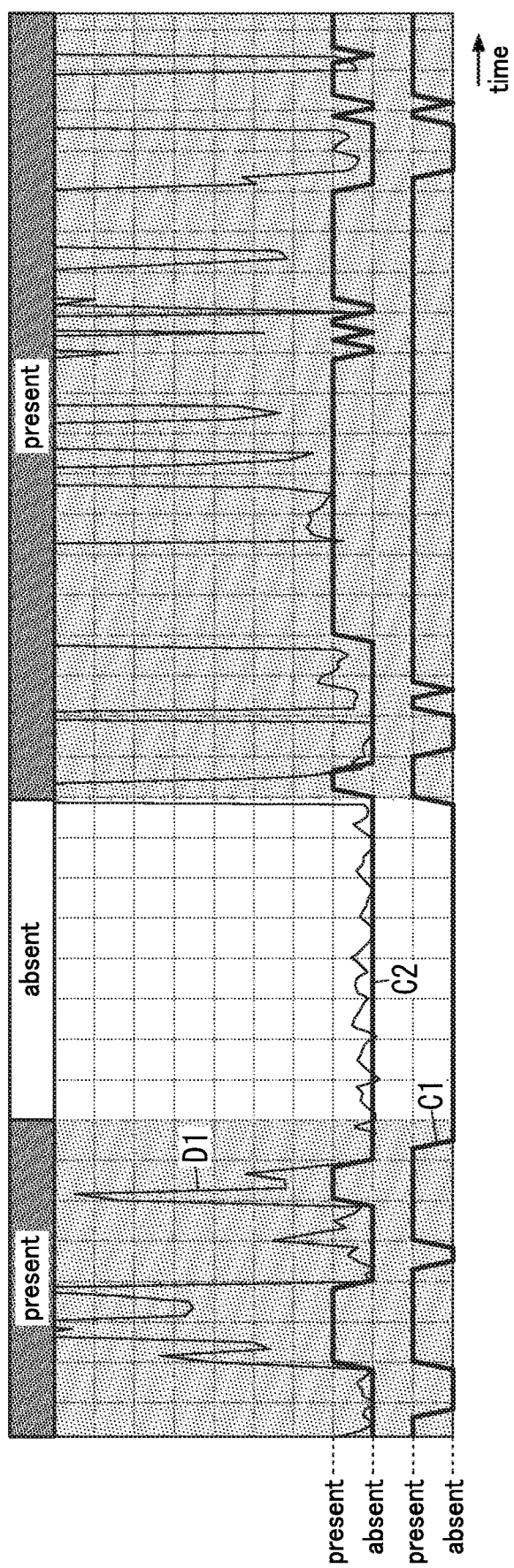
FIG. 7 is a timing chart showing the decisions made by the sensor system.

FIG. 7 illustrates exemplary results of measurement of the body movement measurement data D1. In FIG. 7, C1 indicates the results obtained in this embodiment and C2 indicates the results obtained when a decision about presence or absence was made based on the magnitude of the body movement measurement data D1. Even in a situation where the human is present in the object space 100, the magnitude of the body movement measurement data still decreases while he or she is at rest, e.g., sleeping, watching TV, for example, or reading a book. Therefore, if a decision is made about the presence or absence based on the magnitude of the body movement measurement data, the presence state is often taken erroneously for the absence state. However, this embodiment does improve the accuracy of decision by making a decision about the presence or absence by time series analysis.

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the sensor processing system 3 and sensor system 1 may be implemented as a presence/absence detection method, a (computer) program, or a non-transitory storage medium that stores the program thereon, for example. A presence/absence detection method according to an aspect of the present disclosure includes acquisition processing (corresponding to Step S1 shown in FIG. 3), time series analysis processing (corresponding to Step S31 shown in FIG. 5), and decision processing (corresponding to Step S38 shown in FIG. 5). The acquisition processing includes acquiring measurement data from a measuring unit 2 configured to measure a physical quantity, of which a value varies depending on whether a human is present in, or absent from, an object space 100. The time series analysis processing includes obtaining an analysis model for a time series analysis in which the measurement data acquired at a predetermined timing is represented by multiple items, acquired before the predetermined timing, of the measurement data. The decision processing includes deciding, depending on a decision condition including a condition concerning a coefficient of the analysis model, whether the human is present or absent at the predetermined timing. A (computer) program according to another aspect is designed to make a computer system execute the acquisition processing, the time series analysis processing, and the decision processing.

Next, variations of the first embodiment will be enumerated one after another. Optionally, any of the variations to be described below may be adopted in combination as appropriate.

The sensor processing system 3, sensor system 1, and the agent that carries out the presence/absence detection method according to the present disclosure may each include a computer system. In that case, the computer system may include, as principal hardware components, a processor and a memory. The functions of the sensor processing system 3, sensor system 1, and the agent that carries out the presence/absence detection method according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be integrated together on a single chip or distributed on multiple chips without limitation. Those multiple chips may be integrated together in a single device or distributed in multiple devices without limitation.

Furthermore, in the first embodiment described above, the "human" as the subject is a person to be taken care of. However, this is only an example and should not be construed as limiting. Alternatively, the "human" may also be any other person who uses the object space such as a space in a room.

Also, in the first embodiment described above, the sensor processing system 3 is implemented as a single system. However, this is only an example and should not be construed as limiting. Alternatively, the sensor processing system 3 may also be implemented as two or more distributed systems. For example, the sensor processing system 3 may be implemented as a single system in which the respective functions of the acquisition unit 31, the time series analysis unit 301, and the decision unit 302 are aggregated together in a single housing, for example. In an alternative embodiment, the function of at least one of the acquisition unit 31, the time series analysis unit 301, or the decision unit 302 may be distributed in two or more systems. Still alternatively, the respective functions of the acquisition unit 31, the time series analysis unit 301, and the decision unit 302 may be distributed in multiple devices as well. For example, the function of the time series analysis unit 301 or the decision unit 302 may be distributed in two or more systems as well. Optionally, at least some function of the sensor processing system 3 may be implemented as a cloud computing system as well.

In the first embodiment described above, the arithmetic processing unit 30 makes, based on both the magnitude of the cardiac rate measurement data and the magnitude of the respiratory measurement data, a decision about the presence or absence in the first decision processing. However, this is only an example and should not be construed as limiting. Alternatively, the arithmetic processing unit 30 may also make the decision based on either the magnitude of the cardiac rate measurement data or the magnitude of the respiratory measurement data.

Also, in the first embodiment described above, the time series analysis unit 301 obtains an analysis model for a time series analysis in which the body movement measurement data acquired at a predetermined timing is represented by 30 items, acquired in the past, of the body movement measurement data. However, the number of items of the body movement measurement data for use in the time series analysis does not have to be 30 but may be changed as appropriate.

Furthermore, in the first embodiment described above, the decision unit 302 pays attention to a first-order coefficient of the analysis model and decides, based on the magnitude of the first-order coefficient, whether the human is present or absent. However, the coefficient of the analysis model does not have to be a first-order coefficient. As long as the coefficient used makes a significant difference depending on whether the human is present or absent, the decision unit 302 may make the decision about whether the human is present or absent based on either a coefficient of any other order or a plurality of coefficients of a predetermined order.

Furthermore, in the first embodiment described above, the decision unit 302 makes a decision about whether the human is present in, or absent from, the object space 100 depending on a decision condition that the coefficient of the analysis model for the time series analysis be greater than a preset threshold value or that the magnitude of the measurement data be greater than a preset decision value. However, this is only an example and should not be construed as limiting. Alternatively, the decision unit 302 may also makes the decision about whether the human is present in, or absent from, the object space 100 depending on only the decision condition that the coefficient of the analysis model for the time series analysis be greater than a preset threshold value. This cuts down the cost of calculation.

Furthermore, in the foregoing description of the first embodiment, if one of two values, being compared with each other, of measurement data, for example, is "greater than" the other, the phrase "greater than" may also be a synonym of the phrase "equal to or greater than" that covers both a situation where these two values are equal to each other and a situation where one of the two values is greater than the other. That is to say, it is arbitrarily changeable, depending on selection of the threshold value or any preset value, whether or not the phrase "greater than" covers the situation where the two values are equal to each other. Therefore, from a technical point of view, there is no difference between the phrase "greater than" and the phrase "equal to or greater than." Similarly, the phrase "equal to or less than" may be a synonym of the phrase "less than" as well.

(Resume)

As can be seen from the foregoing description, a presence/absence detection method according to a first aspect includes acquisition processing, time series analysis processing, and decision processing. The acquisition processing includes acquiring measurement data from a measuring unit (2). The measuring unit (2) is configured to measure a physical quantity, of which a value varies depending on whether a human is present in, or absent from, an object space (100). The time series analysis processing includes obtaining an analysis model for a time series analysis in which the measurement data acquired at a predetermined timing is represented by multiple items, acquired before the predetermined timing, of the measurement data. The decision processing includes deciding, depending on a decision condition including a condition concerning a coefficient (A1) of the analysis model, whether the human is present or absent at the predetermined timing.

According to this aspect, the decision processing includes deciding, depending on a decision condition including a condition concerning a coefficient (A1) of the analysis model obtained by the time series analysis processing, whether the human is present or absent at the predetermined timing. This reduces the chances of the decision processing being affected by a temporary variation in measurement data, thus improving the accuracy of the decision made.

In a presence/absence detection method according to a second aspect, which may be implemented in conjunction with the first aspect, the analysis model is either an auto-regressive model or an extended Kalman model.

This aspect allows the time series analysis to be carried out in accordance with an auto-regressive model or an extended Kalman model.

In a presence/absence detection method according to a third aspect, which may be implemented in conjunction with the first or second aspect, the decision condition is that the coefficient (A1) be greater than a preset threshold value (TH11).

This aspect allows for detecting the presence or absence of the human by comparing the coefficient (A1) of the analysis model for the time series analysis with a threshold value (TH11).

In a presence/absence detection method according to a fourth aspect, which may be implemented in conjunction with the first or second aspect, the decision condition is that the coefficient (A1) be greater than a preset threshold value (TH11) or that magnitude of the measurement data be greater than a preset decision value (TH1, TH2).

This aspect allows for detecting the presence or absence of a human by comparing the coefficient (A1) of the analysis model for the time series analysis with a threshold value (TH11) and by finding the magnitude of the measurement data greater than a decision value (TH1, TH2), thus improving the accuracy of the decision made.

In a presence/absence detection method according to a fifth aspect, which may be implemented in conjunction with the fourth aspect, the physical quantity includes at least one of magnitude of body movement caused by heartbeat or magnitude of body movement caused by respiration. The presence/absence detection method further includes setting processing including setting the decision value (TH1, TH2) according to the magnitude of the measurement data acquired during a specified period.

This aspect allows the decision value (TH1, TH2) for deciding whether a human is present or absent to be set at a value corresponding to the magnitude of body movement caused by heartbeat or the magnitude of body movement caused by respiration. This allows the decision value (TH1, TH2) to be set depending on a condition such as the type of a human as the subject or the sensitivity of measurement of the measuring unit (2), thus improving the accuracy of decision made.

A non-transitory storage medium according to a sixth aspect has stored thereon a program. The program is designed to make a computer system execute acquisition processing, time series analysis processing, and decision processing. The acquisition processing includes acquiring measurement data from a measuring unit (2). The measuring unit (2) is configured to measure a physical quantity, of which a value varies depending on whether a human is present in, or absent from, an object space (100). The time series analysis processing includes obtaining an analysis model for a time series analysis in which the measurement data acquired at a predetermined timing is represented by multiple items, acquired before the predetermined timing, of the measurement data. The decision processing includes deciding, depending on a decision condition including a condition concerning a coefficient of the analysis model, whether the human is present or absent at the predetermined timing.

According to this aspect, the decision processing includes deciding, depending on a decision condition including a condition concerning a coefficient of the analysis model obtained by the time series analysis processing, whether the human is present or absent at the predetermined timing. This reduces the chances of the decision processing being affected by a temporary variation in measurement data, thus improving the accuracy of the decision made.

A sensor processing system (3) according to a seventh aspect includes an acquisition unit (31), a time series analysis unit (301), and a decision unit (302). The acquisition unit (31) is configured to acquire measurement data from a measuring unit (2). The measuring unit (2) is configured to measure a physical quantity, of which a value varies depending on whether a human is present in, or absent from, an object space (100). The time series analysis unit (301) is configured to obtain an analysis model for a time series analysis in which the measurement data acquired at a predetermined timing is represented by multiple items, acquired before the predetermined timing, of the measurement data. The decision unit (302) is configured to decide, depending on a decision condition including a condition concerning a coefficient of the analysis model, whether the human is present or absent at the predetermined timing.

According to this aspect, the decision unit (302) decides, depending on a decision condition including a condition concerning a coefficient of the analysis model obtained by the time series analysis unit (301), whether the human is present or absent at the predetermined timing. This reduces the chances of the decision unit (302) being affected by a temporary variation in measurement data, thus improving the accuracy of the decision made.

In a sensor processing system (3) according to an eighth aspect, which may be implemented in conjunction with the seventh aspect, the physical quantity includes at least one of magnitude of body movement caused by heartbeat or magnitude of body movement caused by respiration.

This aspect allows for deciding, by the magnitude of a physical quantity including at least one of the magnitude of body movement caused by heartbeat or the magnitude of body movement caused by respiration, whether the human is present or absent.

A sensor processing system (3) according to a ninth aspect, which may be implemented in conjunction with the seventh or eighth aspect, further includes an output unit (33) configured to output a decision made by the decision unit (302).

This aspect allows the user of the sensor processing system (3) to learn, based on the decision output from the output unit (33), whether the human is present or absent.

In a sensor processing system (3) according to a tenth aspect, which may be implemented in conjunction with of any one of the seventh to ninth aspects, the object space (100) is at least a designated area of a room used by the human in a facility.

This aspect allows for deciding whether the human is present in, or absent from, the object space (100), which may be at least a designated area of his or her room.

A sensor system (1) according to an eleventh aspect includes the sensor processing system (3) of any one of the seventh to tenth aspects and the measuring unit (2) configured to measure the physical quantity, of which the value varies depending on whether the human is present in, or absent from, the object space (100). The acquisition unit (31) is configured to acquire the measurement data from the measuring unit (2).

According to this aspect, the decision unit (302) decides, depending on a decision condition including a condition concerning a coefficient of the analysis model obtained by the time series analysis unit (301), whether the human is present or absent at the predetermined timing. This reduces the chances of the decision unit (302) being affected by a temporary variation in measurement data, thus improving the accuracy of the decision made.

In a sensor system (1) according to a twelfth aspect, which may be implemented in conjunction with the eleventh aspect, the measuring unit (2) measures the physical quantity by a noncontact method.

This aspect allows the measuring unit (2) to measure the physical quantity by a noncontact method, thus avoiding interference with his or her movement.

Note that these aspects are only exemplary aspects of the present disclosure. That is to say, the present disclosure has many other aspects that have not been mentioned above. For example, various features of the presence/absence detection method according to the first embodiment and variations thereof may also be implemented as a sensor processing system, a sensor system, a (computer) program, and a non-transitory storage medium that stores the program thereon.

Note that the features according to the second to fifth aspects are not essential elements of the presence/absence detection method but may be omitted as appropriate.

It should also be noted that the constituent elements of the eighth to tenth aspects are not essential elements of the sensor processing system (3) but may be omitted as appropriate.

The invention claimed is:

1. A presence/absence detection method for deciding, by a computer system, whether a subject is present in, or absent from, an object space used by a human as the subject, the presence/absence detection method comprising:
   acquisition processing including acquiring measurement data from a measuring unit including a Doppler sensor, the measuring unit being configured to measure at least one of magnitude of body movement caused by heartbeat of the subject in the object space or magnitude of body movement caused by respiration of the subject in the object space by a noncontact method;
   time series analysis processing including obtaining an auto-regressive model for a time series analysis in which the measurement data acquired at a predetermined timing is represented by multiple items, acquired before the predetermined timing, of the measurement data; and
   decision processing including deciding, depending on a first-order coefficient of the auto-regressive model, whether the subject is present or absent in the object space at the predetermined timing,
   the decision processing including:
      deciding, when finding the first-order coefficient of the auto-regressive model greater than a preset threshold value, that the subject is present in the object space at the predetermined timing; and
      deciding, when finding the first-order coefficient of the auto-regressive model equal to or less than the preset threshold value, that the subject is absent in the object space at the predetermined timing.

2. A non-transitory storage medium having stored thereon a program, the program being designed to make a computer system execute:
   acquisition processing including acquiring measurement data from a measuring unit including a Doppler sensor, the measuring unit being configured to measure at least one of magnitude of body movement caused by heartbeat of a subject in an object space used by a human as the subject or magnitude of body movement caused by respiration of the subject in the object space by a noncontact method;
   time series analysis processing including obtaining an auto-regressive model for a time series analysis in which the measurement data acquired at a predetermined timing is represented by multiple items, acquired before the predetermined timing, of the measurement data; and
   decision processing including deciding, when finding a first-order coefficient of the auto-regressive model greater than a preset threshold value, that the subject is present in the object space at the predetermined timing.

3. A sensor processing system comprising:
   an acquisition unit configured to acquire measurement data from a measuring unit including a Doppler sensor, the measuring unit being configured to measure at least one of magnitude of body movement caused by heartbeat of a subject in an object space used by a human as the subject or magnitude of body movement caused by respiration of the subject in the object space by a noncontact method;
   a time series analysis unit configured to obtain an auto-regressive model for a time series analysis in which the measurement data acquired at a predetermined timing is represented by multiple items, acquired before the predetermined timing, of the measurement data; and
   a decision unit configured to decide, when finding a first-order coefficient of the auto-regressive model greater than a preset threshold value, that the subject is present in the object space at the predetermined timing.

4. The sensor processing system of claim 3, further comprising an output unit configured to output a decision made by the decision unit.

5. The sensor processing system of claim 3, wherein
   the object space is at least a designated area of a room used by the human in a facility.

6. A sensor system comprising:
   the sensor processing system of claim 3; and
   the measuring unit,
   the acquisition unit being configured to acquire the measurement data from the measuring unit.

* * * * *